United States Patent [19]
Srinivasan et al.

[11] Patent Number: 5,846,285
[45] Date of Patent: Dec. 8, 1998

[54] APPARATUS FOR PRODUCING CONTINUOUS GLASS FILAMENTS

[75] Inventors: Seshadri Srinivasan, Worthington; Clarence E. Fracker, Jr., Frazeysburg, both of Ohio

[73] Assignee: Owens-Corning Fiberglas Technology Inc., Summit, Ill.

[21] Appl. No.: 599,693

[22] Filed: Feb. 12, 1996

[51] Int. Cl.[6] ............................ C03B 5/44; C03B 37/085; C03B 37/08

[52] U.S. Cl. ........................... 65/498; 65/492; 65/374.12; 65/25.1

[58] Field of Search .............................. 65/481, 511, 512, 65/374.12, 498, 492, 25.1

[56] References Cited

U.S. PATENT DOCUMENTS

| | | |
|---|---|---|
| 3,082,615 | 3/1963 | de Toledo . |
| 3,150,946 | 9/1964 | Russell . |
| 3,334,981 | 8/1967 | Glaser .................................... 65/512 |
| 3,468,643 | 9/1969 | Stalego . |
| 3,518,069 | 6/1970 | Cole, Jr. .................................. 65/481 |
| 3,647,382 | 3/1972 | Tilbrook .............................. 65/374.12 |
| 3,746,525 | 7/1973 | Kasuga et al. . |
| 3,775,074 | 11/1973 | Russell . |
| 3,867,118 | 2/1975 | Russell .................................... 65/512 |
| 4,018,586 | 4/1977 | Cates, Jr. et al. ........................ 65/481 |
| 4,050,916 | 9/1977 | Russell . |
| 4,153,438 | 5/1979 | Stream .................................... 65/481 |
| 4,197,103 | 4/1980 | Ishikawa . |
| 4,214,884 | 7/1980 | Martin, Jr. .......................... 65/374.12 |
| 4,332,602 | 6/1982 | Jensen .................................... 65/498 |
| 4,337,075 | 6/1982 | Mechel . |
| 4,541,853 | 9/1985 | Sullivan . |
| 4,566,890 | 1/1986 | Hostler . |
| 4,571,251 | 2/1986 | Sullivan . |
| 4,589,898 | 5/1986 | Beaver .................................... 65/512 |
| 4,662,922 | 5/1987 | Hill . |
| 4,818,265 | 4/1989 | Krumwiede et al. ................. 65/135 |
| 5,244,483 | 9/1993 | Brosch et al. ........................ 65/512 |

OTHER PUBLICATIONS

Webster's Ninth New Collegiate Dictionary, p. 631, 1990.

*Primary Examiner*—Donald E. Czaja
*Assistant Examiner*—Jacqueline A. Ruller
*Attorney, Agent, or Firm*—C. Michael Gegenheimer; Inger H. Eckert

[57] ABSTRACT

An apparatus is provided for producing continuous glass filaments. The apparatus comprises a feeder (20) for supplying streams of molten glass to be drawn into continuous filaments, a drawing device (40) adapted to draw the streams into the filaments, and heat removal apparatus (50) located adjacent to the feeder for transferring energy in the form of heat away from a filament forming area adjacent to the feeder. The heat removal apparatus includes first and second manifolds (52a, 54) through which a cooling fluid circulates, a plurality of fins (56) having first and second ends (56a and 56b) and interface material (58). The first ends of the fins are associated with the first manifold and the second ends are positioned adjacent to the second manifold. The first ends may be fixedly connected to the first manifold. The interface material is interposed between the second manifold and the second ends to provide a path for energy in the form of heat to flow from the fins to the second manifold.

20 Claims, 9 Drawing Sheets

APPARATUS FOR PRODUCING CONTINUOUS GLASS FILAMENTS

TECHNICAL FIELD

This invention relates generally to apparatus for producing continuous glass filaments and, more particularly, to such apparatus having a bushing and fin heat removal apparatus positioned beneath the bushing for transferring energy in the form of heat away from a filament forming area beneath the bushing.

BACKGROUND ART

Apparatus for transferring heat from a filament forming area beneath a bushing are known in the art. Such apparatus typically comprise a plurality of cooling fins which extend between rows of bushing tips or nozzles. The fins may be cantilevered from a single water-cooled manifold or may be secured at their ends to a pair of water-cooled manifolds. The former system is commonly referred to as a "single manifold system," while the latter system is referred to as a "dual manifold system."

Dual manifold systems are advantageous in that they remove a greater amount of heat from the filament forming area than single manifold systems. Because a greater amount of energy is removed, the temperature of the bushing and the glass in the bushing can be increased which allows throughput to be increased. However, dual manifold systems having fins fixedly secured to both manifolds are not preferred by operators. This is because such systems limit the ability of operators to view and clean the fins, the bushing tip plate and the area between the fins and the bushing tip plate.

U.S. Pat. Nos. 4,571,251 and 4,541,853 to Sullivan et al. each disclose a dual manifold system having a removable second manifold. The removable manifolds are provided with slots for receiving distal ends of fins cantilevered from a first manifold. If the fins are not properly seated within those slots, heat transfer from the fins to the second manifold is reduced. Hence, interface thermal resistance between the fins and the second manifold increases and, thus, the amount of heat which is transferred away from the filament forming area is reduced. Further, the slots define the length of the gaps between adjacent fins, the angle at which each fin is oriented relative to vertical and the thickness of each fin. Hence, the predefined slots prevent fin spacing, fin angular orientation and fin thickness to be changed easily.

Accordingly, there is a need for improved apparatus for transferring heat away from a filament forming area beneath a filament forming bushing.

DISCLOSURE OF INVENTION

This need is met by the present invention, whereby improved apparatus is provided for transferring energy in the form of heat from a filament forming area beneath a bushing used in a continuous filament forming process. The apparatus includes a plurality of fins which are secured to a first fluid-cooled manifold. Distal ends of those fins are located adjacent to a second fluid-cooled manifold. Interposed between the fins and the second manifold is interface material which provides a path for energy in the form of heat to flow from the fins to the second manifold.

It is common for operators to adjust the location of cooling fins relative to a bushing in order to vary the heat pattern or temperature distribution in the bushing tip plate. The interface material ensures that there will be good thermal contact between the fins and the second manifold after fin location adjustments have been made. This yields improved and consistent heat transfer from the fins to the second manifold.

The present invention is also advantageous as it allows an existing single manifold system to be easily retrofitted so as to become a double manifold system. This involves positioning a second manifold, constructed in accordance with the present invention, adjacent to the fins of the existing single manifold system. Interface material is interposed between the existing fins and the second manifold. Thus, the existing manifold and fins work in conjunction with the new, second manifold to form a double manifold system which removes a greater amount of heat from the filament forming area than the previous single manifold system.

In accordance with another embodiment of the present invention, the second manifold is provided with orifices through which water is directed onto the fins and the interface material. The water, as it is heated by the fins and the interface material, conductively transfers heat away from the fins.

In accordance with a first aspect of the present invention, an apparatus is provided for producing continuous glass filaments. The apparatus comprises a feeder for supplying streams of molten glass to be drawn into continuous filaments, a drawing device adapted to draw the streams into the filaments, and heat removal apparatus located adjacent to the feeder for transferring energy in the form of heat away from a filament forming area adjacent to the feeder. The heat removal apparatus includes first and second manifolds through which a cooling fluid circulates, a plurality of first fins having first and second ends and first interface material which is separate from the first fins. The first ends of the first fins are associated with the first manifold and the second ends are positioned adjacent to the second manifold. The first ends may be fixedly connected to the first manifold. The interface material is interposed between the second manifold and portions of the second ends which are closest to the second manifold to provide a path for energy in the form of heat to flow from the first fins to the second manifold.

In accordance with a first embodiment of the present invention, the interface material comprises a metal sponge material. Preferably, the sponge material is made from copper. The sponge material may also be made from aluminum, nickel, silver or any other material that is a good conductor of heat.

In accordance with a second embodiment of the present invention, the interface material comprises metal shim stock which is fixedly connected to the second manifold. The metal shim stock may be formed from copper, nickel, aluminum, silver or any other material that is a good conductor of heat.

In accordance with a further embodiment of the present invention, the second manifold has orifices through which at least a portion of the cooling fluid passes as it is directed onto the interface material and the first fins. The cooling fluid preferably comprises water. Heat is conducted away from the fins and the interface material as the water is heated by the fins and the interface material. The water, upon being heated, vaporizes and/or stays in liquid form and drips down from the fins and the interface material. It is preferred that most of the water vaporizes so as to minimize the risk that heated water may drip onto an operator. The amount of water that does not vaporize can be minimized by controlling the rate at which water is directed onto the fins and the interface material.

It is also contemplated that the second manifold may comprise a plurality of manifold tubes.

The heat removal apparatus may further include a third manifold through which a cooling fluid circulates, a plurality of second fins having third and fourth ends and second interface material. Each of the third ends is positioned adjacent to the second manifold and the fourth ends are associated with the third manifold. The second interface material is interposed between the second manifold and the third ends to act as a path for energy in the form of heat to flow from the second fins to the second manifold. The second manifold may engage the feeder to provide support for the feeder.

In accordance with a second aspect of the present invention, an apparatus is provided for producing continuous glass filaments. The apparatus comprises a feeder for supplying streams of molten glass to be drawn into continuous filaments; a drawing device adapted to draw the streams into the filaments; and, heat removal apparatus located adjacent to the feeder for transferring energy in the form of heat away from a filament forming area adjacent to the feeder. The heat removal apparatus includes first and second manifolds through which a cooling fluid circulates, a plurality of fins having first and second ends, and interface material which contacts the second ends of the fins. The first ends of the fins are associated with the first manifold and the second ends of the fins are positioned adjacent to the second manifold. The second manifold has a plurality of orifices for directing at least a portion of the cooling fluid toward the fins and the interface material. The cooling fluid contacts the fins and the interface material and, as it is heated by the fins and the interface material, transfers heat away from the fins.

The second ends of the fins may be spaced from the second manifold such that the interface material does not actually contact the second manifold. Alternatively, the second ends of the fins may be located adjacent to the second manifold such that the interface material contacts the second manifold. As such, the interface material provides a path for energy in the form of heat to flow conductively from the fins to the second manifold. Energy is also transferred from the fins as the water, which has passed through the orifices in the second manifold, is heated. As noted above, the heated water may vaporize and/or stay in liquid form and drip from the fins and the interface material.

In accordance with a third aspect of the present invention, a heat removal apparatus is provided and is located adjacent to a feeder for supplying streams of molten glass to be drawn into continuous filaments. The heat removal apparatus transfers energy in the form of heat away from a filament forming area adjacent to the feeder. The heat removal apparatus comprises first and second manifolds through which a cooling fluid circulates, a plurality of first fins having first and second ends, and first interface material. The first ends of the fins are associated with the first manifold and the second ends of the fins are positioned adjacent to the second manifold. The interface material is interposed between the second manifold and the second ends to provide a path for energy in the form of heat to flow from the fins to the second manifold.

The heat removal apparatus may further include a third manifold through which a cooling fluid circulates, a plurality of second fins having third and fourth ends and second interface material. Each of the third ends is positioned adjacent to the second manifold and the fourth ends are associated with the third manifold. The second interface material is interposed between the second manifold and the third ends to act as a path for energy in the form of heat to flow from the second fins to the second manifold.

Accordingly, it is an object of the present invention to provide an apparatus for producing continuous glass filaments having an improved heat removal apparatus. It is also an object of the present invention to provide a heat removal apparatus having interface material interposed between fins and a fluid-cooled manifold to provide a path for energy in the form of heat to flow from the fins to the manifold. It is further an object of the present invention to provide a heat removal apparatus having a manifold provided with orifices through which water passes as it is directed onto cooling fins located beneath a filament forming bushing. These and other objects of the present invention will be apparent from the following description, the accompanying drawings and the appended claims.

MODES FOR CARRYING OUT THE INVENTION

Figure 1:
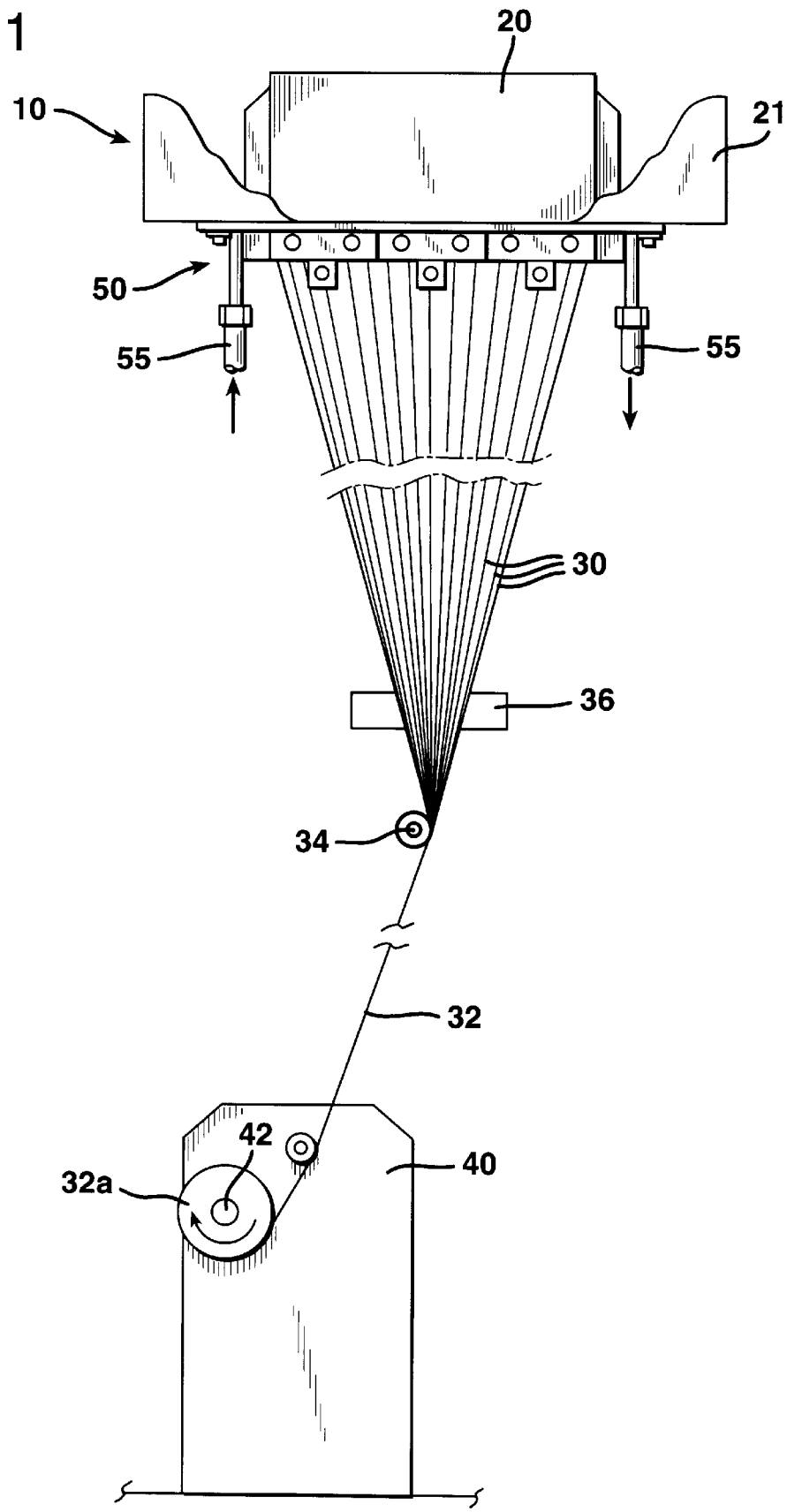
FIG. 1 is a side view of an apparatus constructed in accordance with the present invention for producing continuous glass filaments.
Figure 6:
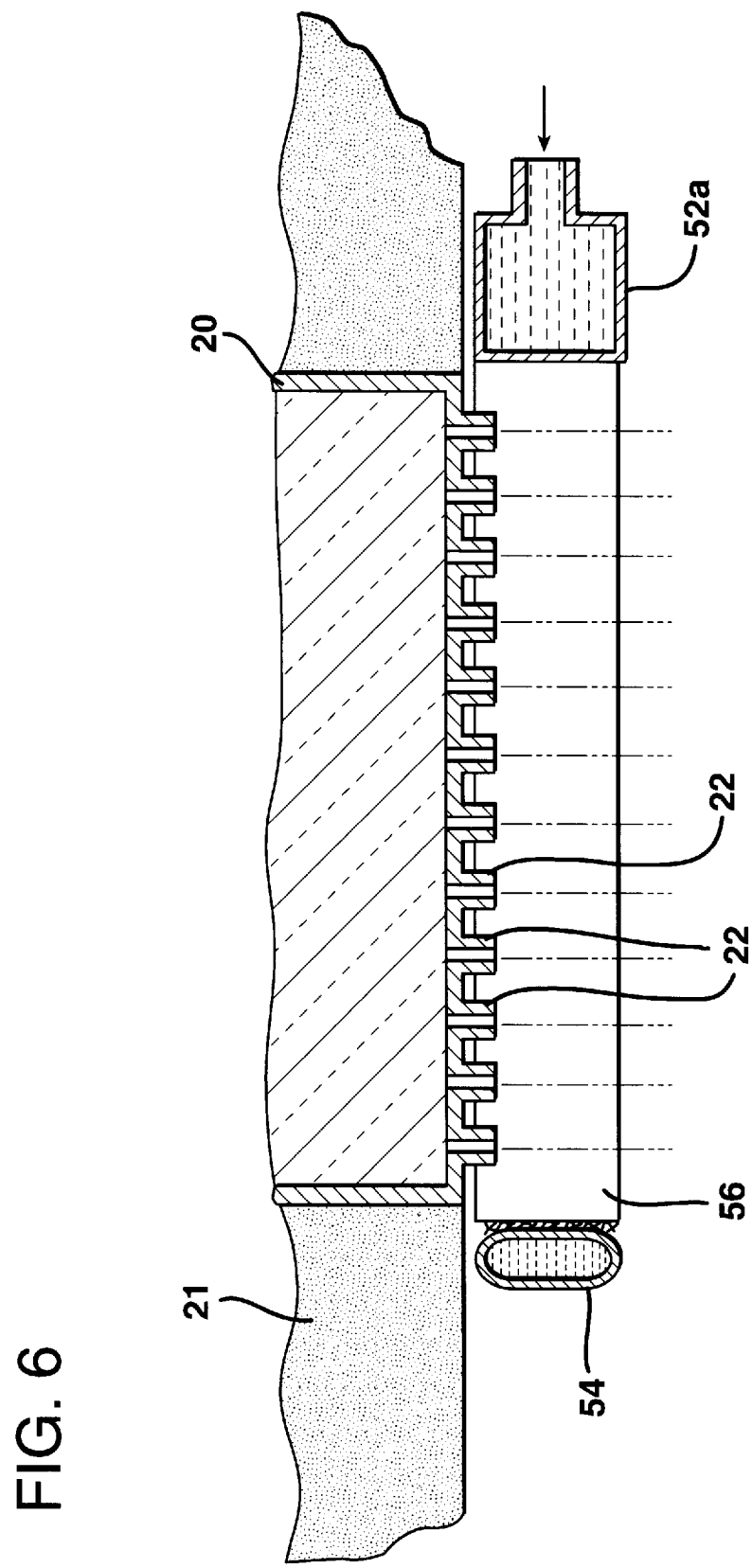
FIG. 6 is a cross-sectional view taken through the heat removal apparatus illustrated in FIG. 2.

An apparatus 10 constructed in accordance with the present invention for producing continuous glass filaments is illustrated in FIG. 1. The apparatus 10 includes a bushing 20, also referred to herein as a feeder, which is encased in refractory material 21. The bushing 20 is provided with a number of nozzles or tips 22 through which streams of molten glass are discharged, see FIGS. 2 and 6. The streams of glass are mechanically drawn to form continuous filaments 30 via a winder device 40. In the illustrated embodiment, the filaments 30 are gathered into a continuous strand 32 at gathering roller 34, after having received a protective coating or sizing composition from sizing applicator 36. The strand 32 is wound onto a rotating collet 42 of winder device 40 to form a package 32a.

The apparatus 10 further includes a heat removal apparatus 50 located in a filament forming area just below the bushing 20 for removing heat from the glass streams discharged by the bushing 20. Quenching of the glass must occur in a timely manner for glass filaments to be formed. If the cooling rate of the glass is too low, breakage of the glass will eventually occur causing a shut-down in the filament forming process.

Figure 2:
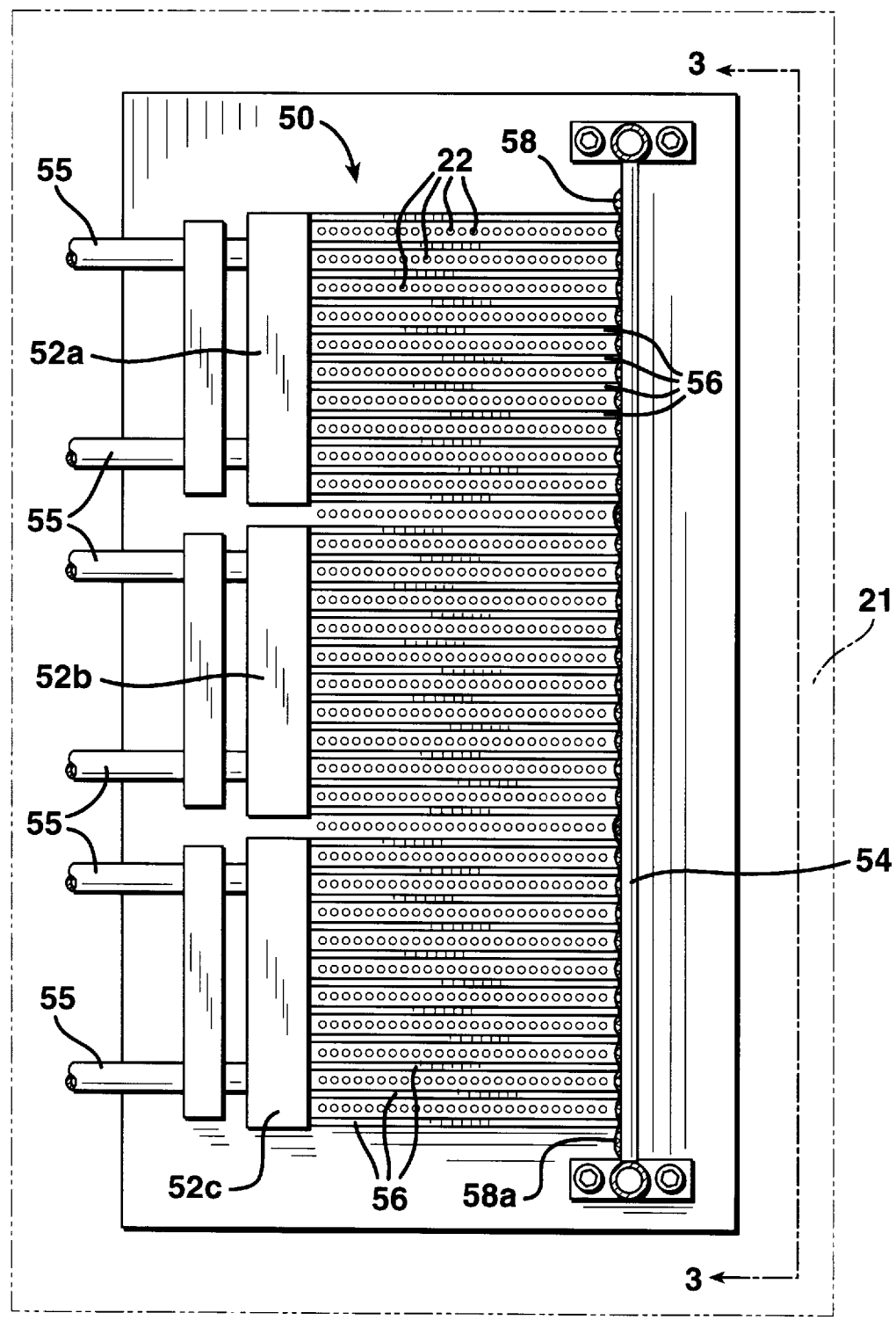
FIG. 2 is view looking at the underside of the bushing and heat removal apparatus of the apparatus illustrated in FIG. 1.
Figure 3:
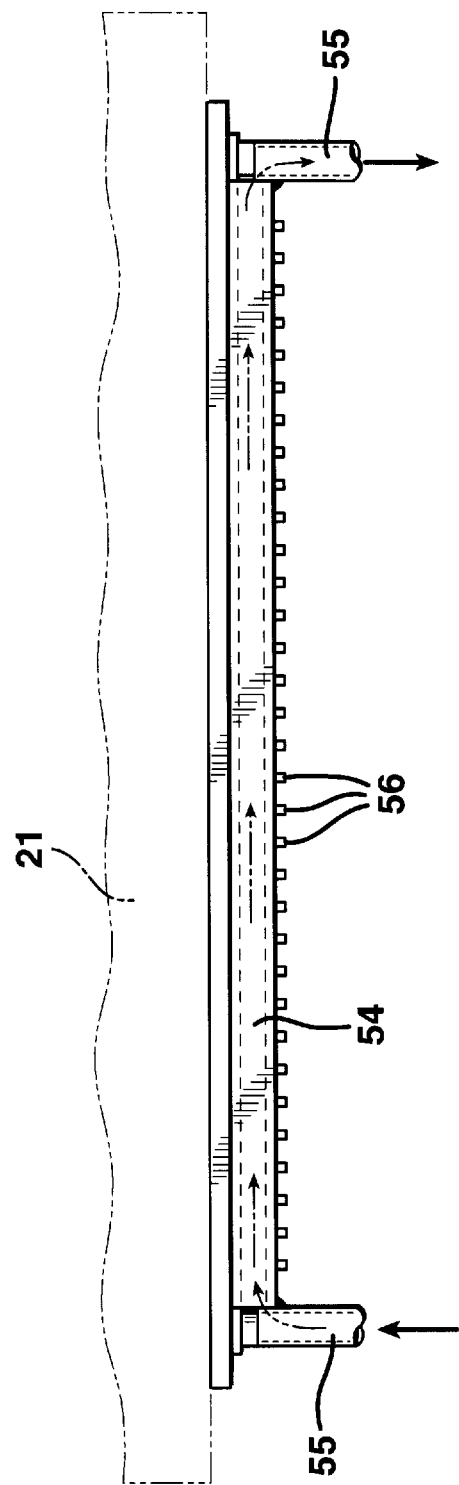
FIG. 3 is a view taken along view line 3—3 in FIG. 2.
Figure 4:
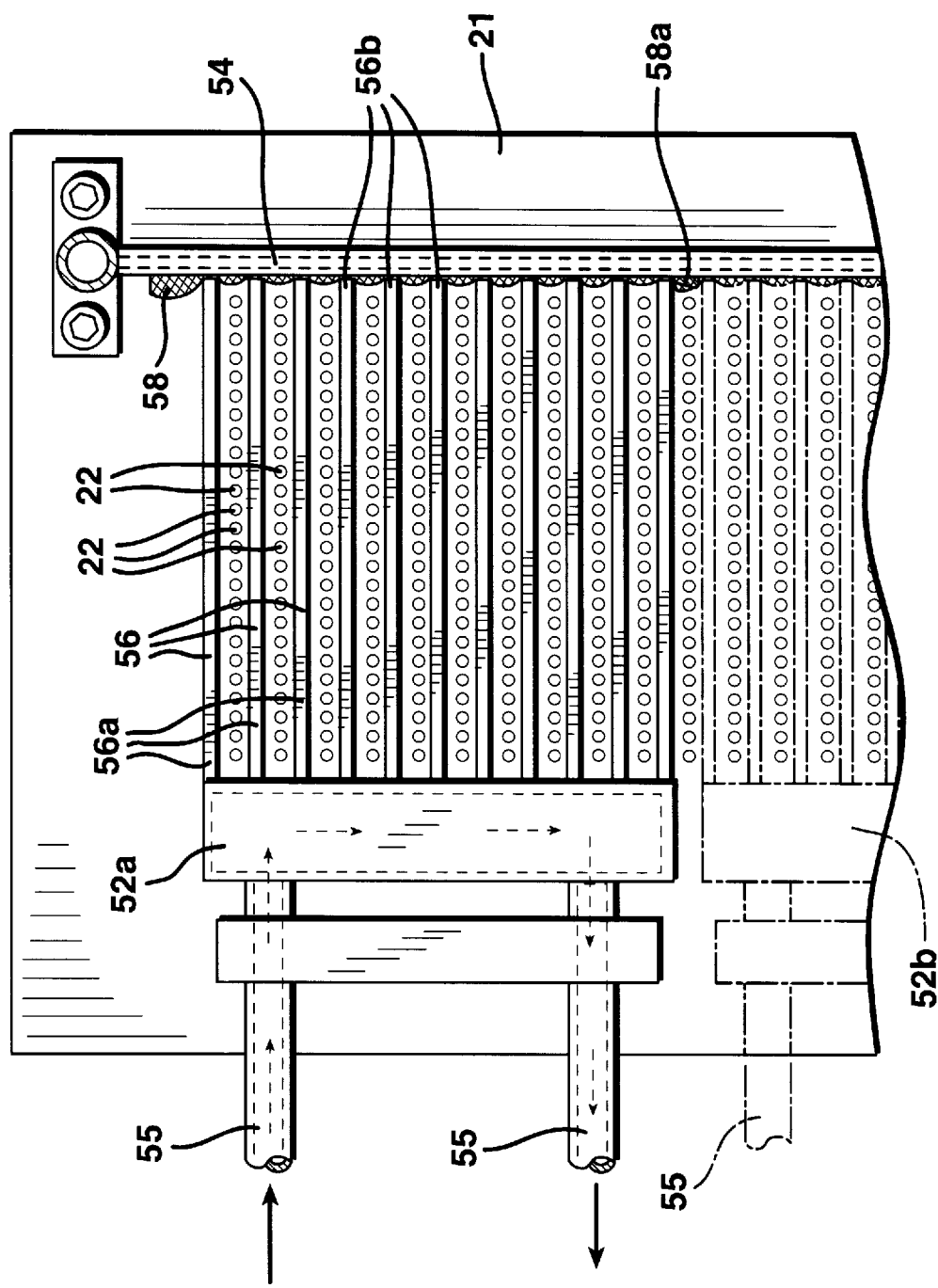
FIG. 4 is an enlarged view showing a portion of the apparatus illustrated in FIG. 2.
Figure 5:
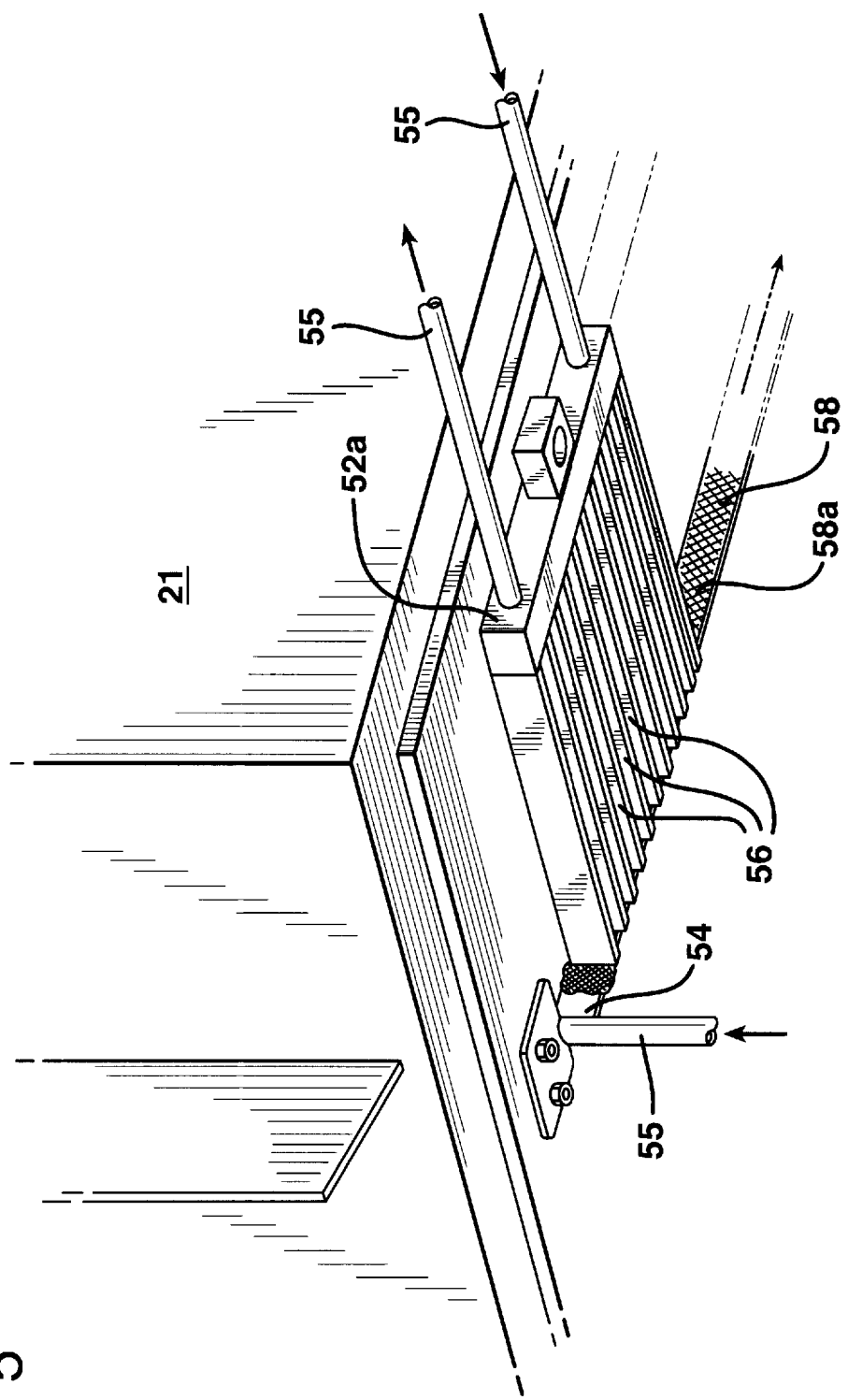
FIG. 5 is a perspective view of a portion of the apparatus illustrated in FIG. 2.

The heat removal apparatus 50 includes a plurality of first manifolds 52a–52c, a second manifold 54 and a plurality of first cooling fins 56 which extend between rows of the bushing tips 22, see FIGS. 2 and 4. In the embodiment illustrated in FIG. 2, a single row of bushing tips 22 is located between each set of adjacent fins 56. It is also contemplated that two or three rows of bushing tips 22 may be located between each set of adjacent fins 56.

First ends 56a of the fins 56 are fixedly connected to the first manifolds 52a–52c and second ends 56b of the fins 56 extend so as to be positioned adjacent to the second manifold 54, see FIG. 4. Interposed between the fins 56 and the second manifold 54 is interface material 58 which, in the embodiment illustrated in FIGS. 2–6, comprises copper sponge material 58a. Such material is commercially available from McMaster-Carr under the product name Metal Wool and Sponges/Metal Gauze. The copper sponge material 58a may be silver soldered or frictionally secured to the second manifold 54.

It is common for operators to adjust the location of cooling fins relative to a bushing in order to vary the heat pattern or temperature distribution in the bushing tip plate. If interface material 58 is not provided between the fins 56 and the second manifold 54, i.e., if the second ends 56b are merely abutted against the second manifold 54, there may be gaps between one or more of the fins 56 and the second manifold 54 after adjustments are made to the location of the cooling fins 56. Hence, interface thermal resistance between the fins 56 and the second manifold 54 would increase and, thus, the amount of heat transferred away from the filament forming area would be reduced. Because the copper sponge material 58 is somewhat resilient, i.e., it contracts and expands easily, it ensures that a good thermal path is provided between each fin 56 and the second manifold 54, even after adjustments are made to the location of the cooling fins 56.

A cooling fluid, such as water, circulates through the first and second manifolds 52a–52c and 54 for removing heat which has conductively passed to the manifolds 52a–52c and 54 from the fins 56. Hoses 55 connect with the first and second manifolds 52a–52c and 54 for providing the cooling fluid to each manifold from a supply device (not shown) and for providing a path for the heated fluid to return to the supply device after it has passed through a manifold.

Figure 7A:
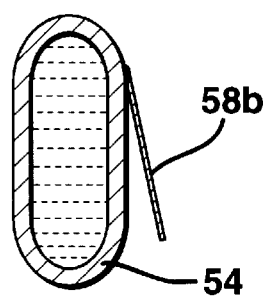
FIGS. 7a and 7b illustrate a modified embodiment showing interface material made from shim stock.
Figure 7B:
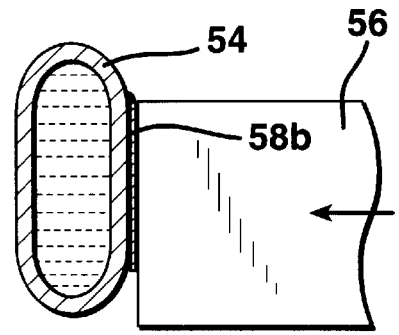

It is also contemplated that the interface material 58 may comprise copper shim stock 58b, see FIGS. 7a and 7b. The shim stock 58b comprises a strip of copper material which extends along the length of the second manifold 54. The shim stock 58b is fixedly connected to the second manifold 54 so as to extend diagonally out from the second manifold 54. As the fins 56 are positioned adjacent to the second manifold 54, they push against the shim stock 58b causing it to move toward the second manifold 54. So long as each fin 56 makes contact with the shim stock 58b, a path will be provided for energy in the form of heat to flow from each fin 56 to the second manifold 54.

Figure 8A:
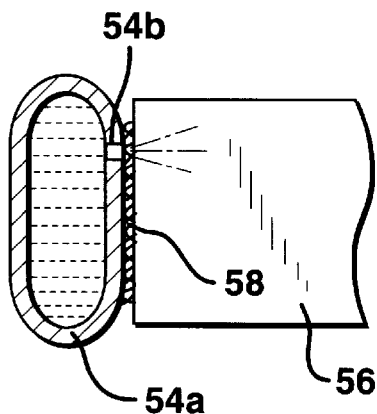
FIGS. 8a and 8b illustrate further embodiments where the second manifold is provided with orifices through which a cooling fluid passes as it is directed onto cooling fins and interface material.
Figure 8B:
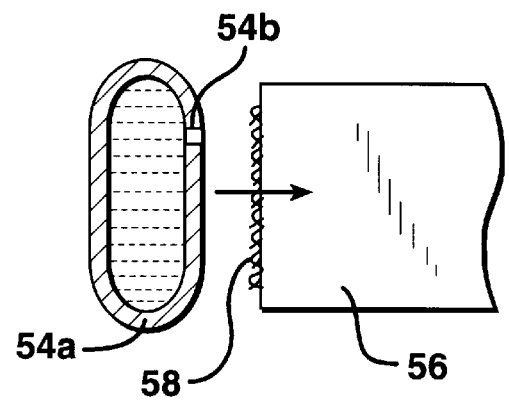

In accordance with another embodiment of the present invention, the second manifold 54a has orifices 54b through which at least a portion of the cooling fluid passes as it is directed onto the interface material 58 and the fins 56, see FIGS. 8a and 8b. The cooling fluid preferably comprises water. Heat is conducted away from the fins 56 and the interface material 58 as the water is conductively heated by the fins 56 and the interface material 58. The water, upon being heated, vaporizes and/or stays in liquid form and drips down from the fins 56 and the interface material 58. It is preferred that most if not all of the water vaporizes so as to minimize the risk that heated water may drip down onto an operator. The amount of water that does not vaporize can be minimized by controlling the rate at which water is directed onto the fins 56 and the interface material 58.

In the embodiment illustrated in FIG. 8a, the fins 56 are positioned adjacent to the second manifold 54a such that the interface material 58 contacts the second manifold 54a. As such, the interface material 58 provides a path for energy in the form of heat to flow conductively from the fins 56 to the second manifold 54. As just noted, energy is also transferred from the fins 56 as the water, which has passed through the orifices 54b in the second manifold 54a, is heated by the fins 56 and the interface material 58. One or more rows of orifices 54b may be provided in the second manifold 54a.

In the embodiment illustrated in FIG. 8b, the fins 56 are spaced from the second manifold 54a such that the interface material 58 does not contact the second manifold 54a. The interface material 58 may be frictionally or otherwise secured to the fins 56. Energy is transferred from the fins 56 as the water, which has passed through the orifices 54b in the second manifold 54a, is heated by the fins 56 and the interface material 58.

Figure 9A:
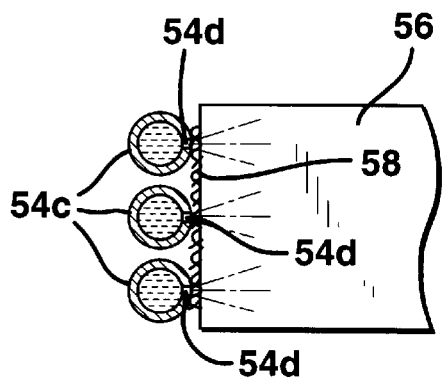
FIGS. 9a and 9b illustrate additional embodiments where the second manifold is formed from a plurality of manifold tubes.

In the embodiment illustrated in FIG. 9a, the second manifold is formed from three tubes 54c through which a cooling fluid, such as water, is circulated. Each tube 54c is provided with one or more rows of orifices 54d through which at least a portion of the water is dispersed onto the fins 56 and the interface material 58. In the FIG. 9a embodiment, the fins 56 are positioned adjacent to the tubes 54c such that the interface material 58 contacts the tubes 54c. Thus, the interface material 58 provides a path for energy in the form of heat to flow conductively from the fins 56 to the tubes 54c. Energy is also transferred from the fins 56 as the water, which has passed through the orifices 54d in the tubes 54c, is heated by the fins 56 and the interface material 58.

Figure 9B:
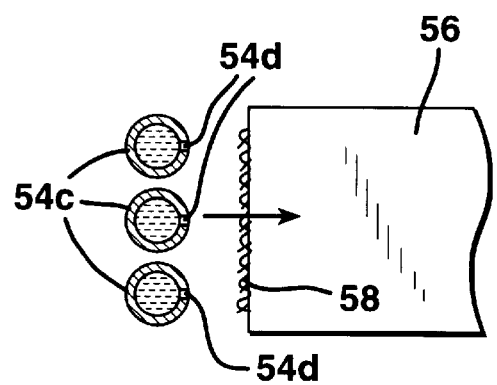

In the embodiment illustrated in FIG. 9b, the fins 56 are spaced from the tubes 54c such that the interface material 58 does not contact the tubes 54c. Energy is transferred from the fins 56 as the water, which has passed through the orifices 54d in the tubes 54c, is heated by the fins 56 and the interface material 58.

Figure 10:
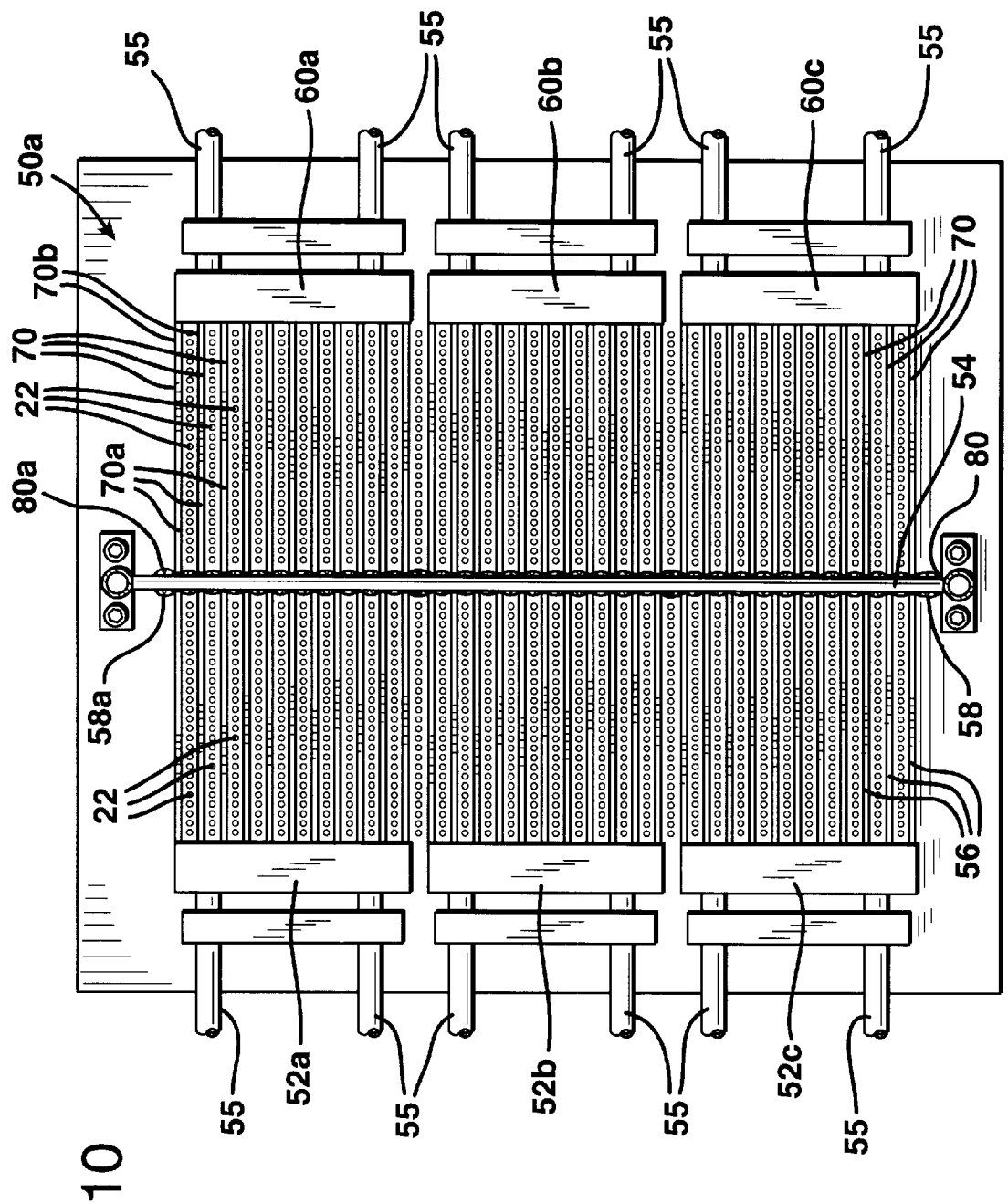
FIG. 10 is a view looking at the underside of a double bottom bushing and heat removal apparatus constructed in accordance with a further embodiment of the present invention.
Figure 11:
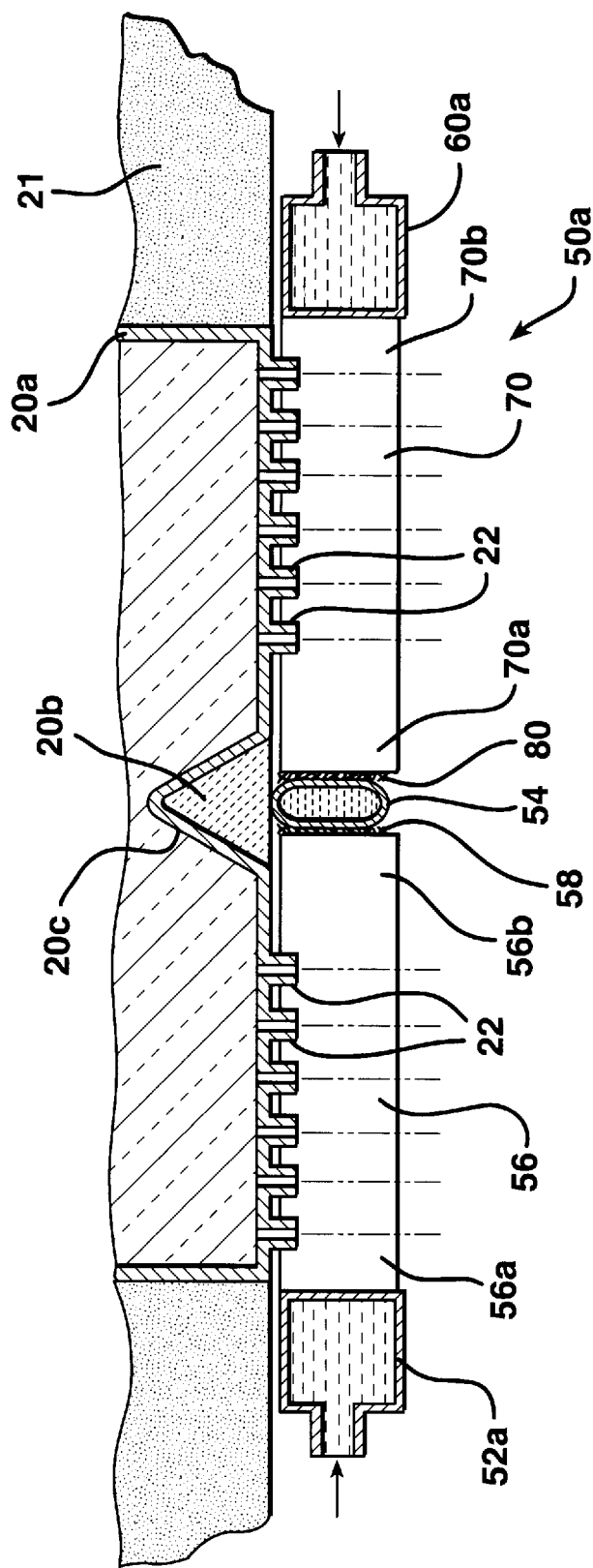
FIG. 11 is a cross-sectional view taken through the heat removal apparatus illustrated in FIG. 10.

In the event that a double bottom bushing 20a is provided, such as shown in FIGS. 10 and 11, a further embodiment of the heat removal apparatus 50a is provided which includes first manifolds 52a–52b, a second manifold 54, first cooling fins 56 and first interface material 58, such as discussed above with regard to the embodiment illustrated in FIGS. 2–6. In this particular embodiment, the second manifold 54 contacts refractory material 20b which extends along a central, lower portion 20c of the bushing 20a to support the bushing 20a.

The heat removal apparatus 50a further includes a plurality of third manifolds 60a–60c, a plurality of second fins 70 which extend between rows of the bushing tips 22, and second interface material 80. One, two or three rows of bushing tips 22 may be located between each set of adjacent fins 70.

Each fin 70 has a third end 70a and a fourth end 70b. The third ends 70a extend so as to be positioned adjacent to the second manifold 54 and the fourth ends 70b are fixedly connected to the third manifolds 60a–60c, see FIGS. 10 and 11. Interposed between the fins 70 and the second manifold 54 is the interface material 80 which, in the embodiment illustrated in FIGS. 10 and 11, comprises copper sponge material 80a. The copper sponge material 80a is similar to the copper sponge material 58a discussed previously. The copper sponge material 80 provides a path for energy in the form of heat to flow from the second fins 70 to the second manifold 54.

A cooling fluid, such as water, circulates through the first, second and third manifolds 52a–52b, 54 and 60a–60c for removing heat which has conductively passed to the manifolds 52a–52b, 54 and 60a–60c from the first and second fins 56 and 70. Hoses 55 connect with the first, second and third manifolds 52a–52b, 54 and 60a–60c for providing the cooling fluid to each manifold from a supply device (not shown) and for providing a path for the heated fluid to return to the supply device after it has passed through a manifold.

It is also contemplated that the interface material 80 may comprise copper shim stock which is similar to the shim stock 58b shown in FIGS. 7a and 7b.

It is further contemplated that the second manifold 54 may be provided with orifices, similar to the orifices 54b illustrated in FIGS. 8a and 8b, on opposing sides of the manifold 54. In this embodiment, at least a portion of the cooling fluid passes through the orifices as it is directed onto the strips of interface material 58 and 80 and the first and second fins 56 and 70. Heat is conducted away from the fins 56 and 70 as the water is conductively heated by the fins 56 and 70 and the strips of interface material 58 and 80. The fins 56 and 70 may be positioned adjacent to the second manifold 54 such that the strips of interface material 58 and 80 contact the second manifold 54. Alternatively, the fins 56 and 70 may be spaced from the second manifold 54 such that the strips of interface material 58 and 80 do not contact the second manifold 54.

Having described the invention in detail and by reference to preferred embodiments thereof, it will be apparent that modifications and variations are possible without departing from the scope of the invention defined in the appended claims. For example, it is contemplated that the fins 56 and 70 may be releasably connected to the first and third manifolds 52–52c and 60a–60c. It is also contemplated that all of the fins 56 and 70 may be positioned so as to be parallel to vertical or one or more of the fins may be oriented at an angle to vertical.

We claim:

1. An apparatus for producing continuous glass filaments comprising:

a feeder for supplying streams of molten glass to be drawn into continuous filaments;

a drawing device adapted to draw said streams into said filaments; and, heat removal apparatus located adjacent to said feeder for transferring energy in the form of heat away from a filament forming area adjacent to said feeder, said heat removal apparatus including first and second manifolds through which a cooling fluid circulates, a plurality of first fins having first and second manifolds through which a cooling fluid circulates, a plurality of first fins having first and second ends and first conductive metal interface material which is separate from said fins and said first and second manifolds, said first ends of said first fins being associated with said first manifold and said second ends of said first fins being positioned adjacent to said second manifold, said conductive metal interface material being interposed between said second manifold and said second ends which are closest to said second manifold and contacts portions of said second manifold and said second ends to provide a path for energy in the form of heat to flow from said first fins to said second manifold.

2. An apparatus as set forth in claim 1, wherein said interface material comprises metal sponge material.

3. An apparatus as set forth in claim 2, wherein said metal sponge material is formed from copper.

4. An apparatus as set forth in claim 1, wherein said interface material comprises shim stock which is fixedly connected to said second manifold.

5. An apparatus as set forth in claim 1, wherein said first ends of said first fins are fixedly connected to said first manifold.

6. An apparatus as set forth in claim 1, wherein said second manifold has orifices through which at least a portion of said cooling fluid is directed onto said interface material and said first fins.

7. An apparatus as set forth in claim 1, wherein said second manifold comprises a plurality of manifold tubes, said manifold tubes being positioned such that each of said second ends of said first fins is located adjacent to said manifold tubes.

8. An apparatus as set forth in claim 1, wherein said heat removal apparatus further includes a third manifold through which a cooling fluid circulates, a plurality of second fins having third and fourth ends and second conductive metal interface material, each of said third ends being positioned adjacent to said second manifold and said fourth ends being associated with said third manifold, said second conductive metal interface material being interposed between said second manifold and said third ends to act as a path for energy in the form of heat to flow from said second fins to said second manifold.

9. An apparatus as set forth in claim 8, wherein said second manifold engages with said feeder to provide support for said feeder.

10. An apparatus as set forth in claim 8, wherein said second interface material comprises metal sponge material.

11. An apparatus as set forth in claim 10, wherein said metal sponge material is made from copper.

12. An apparatus for producing continuous glass filaments comprising:

a feeder for supplying streams of molten glass to be drawn into continuous filaments;

a drawing device adapted to draw said streams into said filaments; and, heat removal apparatus located adjacent to said feeder for transferring energy in the form of heat away from a filament forming area adjacent to said feeder, said heat removal apparatus including first and second manifolds through which a cooling fluid circulates, a plurality of fins having first and second ends and conductive metal interface material which is separate from said fins and said first and second manifolds, and contacts portions of said second manifold and said second ends of said fins which are closest to said second manifold, said first ends of said fins being associated with said first manifold and said second ends of said fins being positioned adjacent to said second manifold, said second manifold having a plurality of orifices for directing at least a portion of said cooling fluid toward said fins and said conductive metal interface material; said cooling fluid contacting said fins and said interface material and upon being heated by said fins and said interface material effecting transfer of heat away from said fins.

13. An apparatus as set forth in claim 12, wherein said interface material further contacts said second manifold for providing a path for energy in the form of heat to flow from said fins to said second manifold.

14. An apparatus as set forth in claim 12, wherein said interface material comprises metal sponge material.

15. An apparatus as set forth in claim 14, wherein said metal sponge material is formed from copper.

16. An apparatus as set forth in claim 12, wherein said first ends of said fins are fixedly connected to said first manifold.

17. An apparatus as set forth in claim 12, wherein said second manifold comprises a plurality of manifold tubes, said manifold tubes being positioned such that each of said second ends of said fins is located adjacent to said manifold tubes.

18. A heat removal apparatus located adjacent to a feeder for supplying streams of molten glass to be drawn into continuous filaments, said heat removal apparatus transferring energy in the form of heat away from a filament forming area adjacent to said feeder, said heat removal apparatus comprising: first and second manifolds through which a cooling fluid circulates, a plurality of first fins having first and second ends and first conductive metal interface material which is separate from said fins and said first and second manifolds, said first ends of said first fins being associated with said first manifold and said second ends of said first fins being positioned adjacent to said second manifold, said conductive metal interface material being interposed between said second manifold and said second ends which are closest to said second manifold and contacts portions of said second manifold and said second ends to provide a path for energy in the form of heat to flow from said first fins to said second manifold.

19. An apparatus as set forth in claim 18, wherein said interface material comprises metal sponge material.

20. An apparatus as set forth in claim 18, wherein said heat removal apparatus further includes a third manifold through which a cooling fluid circulates, a plurality of second fins having third and fourth ends and second conductive metal interface material, each of said third ends being positioned adjacent to said second manifold and said fourth ends being associated with said third manifold, said second conductive metal interface material being interposed between said second manifold and said third ends to act as a path for energy in the form of heat to flow from said second fins to said second manifold.

* * * * *